United States Patent
Ribo

(10) Patent No.: US 7,376,528 B2
(45) Date of Patent: May 20, 2008

(54) DEVICES AND METHODS FOR TESTING CLOCK AND DATA RECOVERY DEVICES

(75) Inventor: Jerome J. Ribo, San Jose, CA (US)

(73) Assignee: Kawasaki LSI U.S.A., Inc., San Jose, CA (US)

( * ) Notice: Subject to any disclaimer, the term of this patent is extended or adjusted under 35 U.S.C. 154(b) by 282 days.

(21) Appl. No.: 10/822,806

(22) Filed: Apr. 13, 2004

(65) Prior Publication Data

US 2005/0228605 A1  Oct. 13, 2005

(51) Int. Cl.
*G01D 3/00* (2006.01)

(52) U.S. Cl. .................................... 702/108

(58) Field of Classification Search ................. 702/108
See application file for complete search history.

(56) References Cited

U.S. PATENT DOCUMENTS

| 4,456,890 A * | 6/1984 | Carickhoff .................. 331/1 A |
| 2002/0090045 A1* | 7/2002 | Hendrickson ................ 375/376 |
| 2003/0164724 A1* | 9/2003 | Momtaz et al. ............. 327/165 |
| 2005/0047495 A1* | 3/2005 | Yoshioka ..................... 375/219 |
| 2005/0069071 A1* | 3/2005 | Kim et al. ................... 375/355 |
| 2005/0220240 A1* | 10/2005 | Lesso ......................... 375/372 |
| 2008/0031385 A1* | 2/2008 | Aung et al. ................. 375/316 |

* cited by examiner

*Primary Examiner*—John E Barlow, Jr.
*Assistant Examiner*—Aditya S Bhat
(74) *Attorney, Agent, or Firm*—Oliff & Berridge, PLC

(57) ABSTRACT

When used as a test data generator, CDR internal structures may be applied to generate drift conditions in the test data. For example, a finite state machine phase shifts a clock signal, over time, driving the test data generator thereby producing a drift condition on the test data. Once the test is completed, one of the other CDRs may be used as a tester to similarly generate test data for the first CDR. CDRs may be configured in pairs for this purpose so that one may be used to test the other.

13 Claims, 10 Drawing Sheets

DEVICES AND METHODS FOR TESTING CLOCK AND DATA RECOVERY DEVICES

BACKGROUND OF THE INVENTION

1. Field of Invention

The present invention relates to testing clock and data recovery devices.

2. Description of Related Art

A clock and data recovery device is normally used in transmission and reception of serial data stream that does not transmit a clock signal. Instead, the clock signal is derived from the serial data stream itself.

SUMMARY OF THE INVENTION

While clock and data recovery devices (CDRs) may be tested using data generated by pseudo random number generators or multiple test vectors, there is a need to test CDRs at optimal rates that includes coverage of data drift conditions. This invention provides a CDR that generates test data that incorporates data drift conditions for testing other CDRs. Data drift conditions may be generated by enhancing CDR internal components. For example, a finite state machine may be introduced to cause a shift in the clock signal that drives a test data generator to produce the data drift conditions.

When multiple CDRs are configured together, the CDRs may be used to test each other. A first CDR may be selected to test other CDRs. Once the test is completed, another CDR may be used to test the first CDR. CDRs may be configured in pairs for this purpose so that one may be used to test the other.

BRIEF DESCRIPTION OF THE DRAWINGS

Various exemplary embodiments of the invention are described in detail with reference to the following figures wherein.

DETAILED DESCRIPTION OF PREFERRED EMBODIMENTS

This invention enables a plurality of CDRs to test each other. For a two CDR configuration, during a first phase, a first CDR is used to test a second CDR. During a second phase, the role is reversed, and the second CDR is used to test the first CDR. For ease of understanding, CDR clock and data recovery functions are first discussed, and then test data generation functions are discussed.

Figure 1:
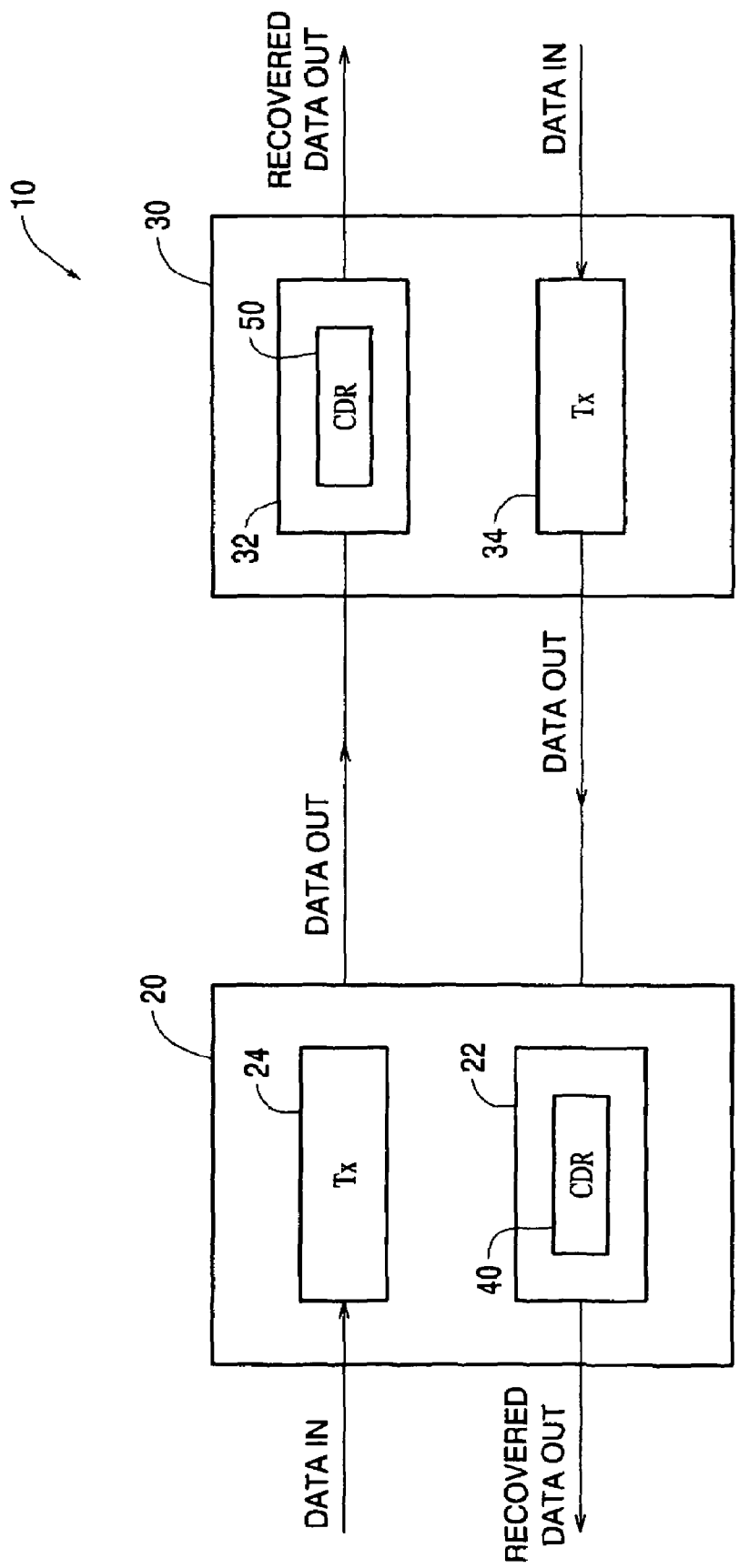
FIG. 1 illustrates an exemplary functional block diagram of a data transmit/receive system.

FIG. 1 is an exemplary functional block diagram of a data transmit/receive system 10 that includes CDRs 40 and 50 in transceivers 20 and 30, respectively. The data transmit/receive system 10 is representative of various communication systems and networks, computer systems and networks, etc. Only one CDR 40 and 50 is shown in each of the transceivers 20 and 30 to simplify discussion. The transceivers 20 and 30 receive serial data streams using the receiver modules 22 and 32, respectively, and transmit serial data streams using transmitter modules 24 and 34, respectively.

The CDRs 40 and 50 retrieve data bits from the respective serial data streams, without requiring a transmitted clock signal. The CDRs 40 and 50 generate a recovered clock based on the respective serial data streams, and the recovered clock is used to recover individual data bits in the respective serial data streams. Typically, data drift conditions exist which result in the serial data streams drifting in phase during transmission. The CDRs 40 and 50 include logic to track such drift conditions.

Figure 2:
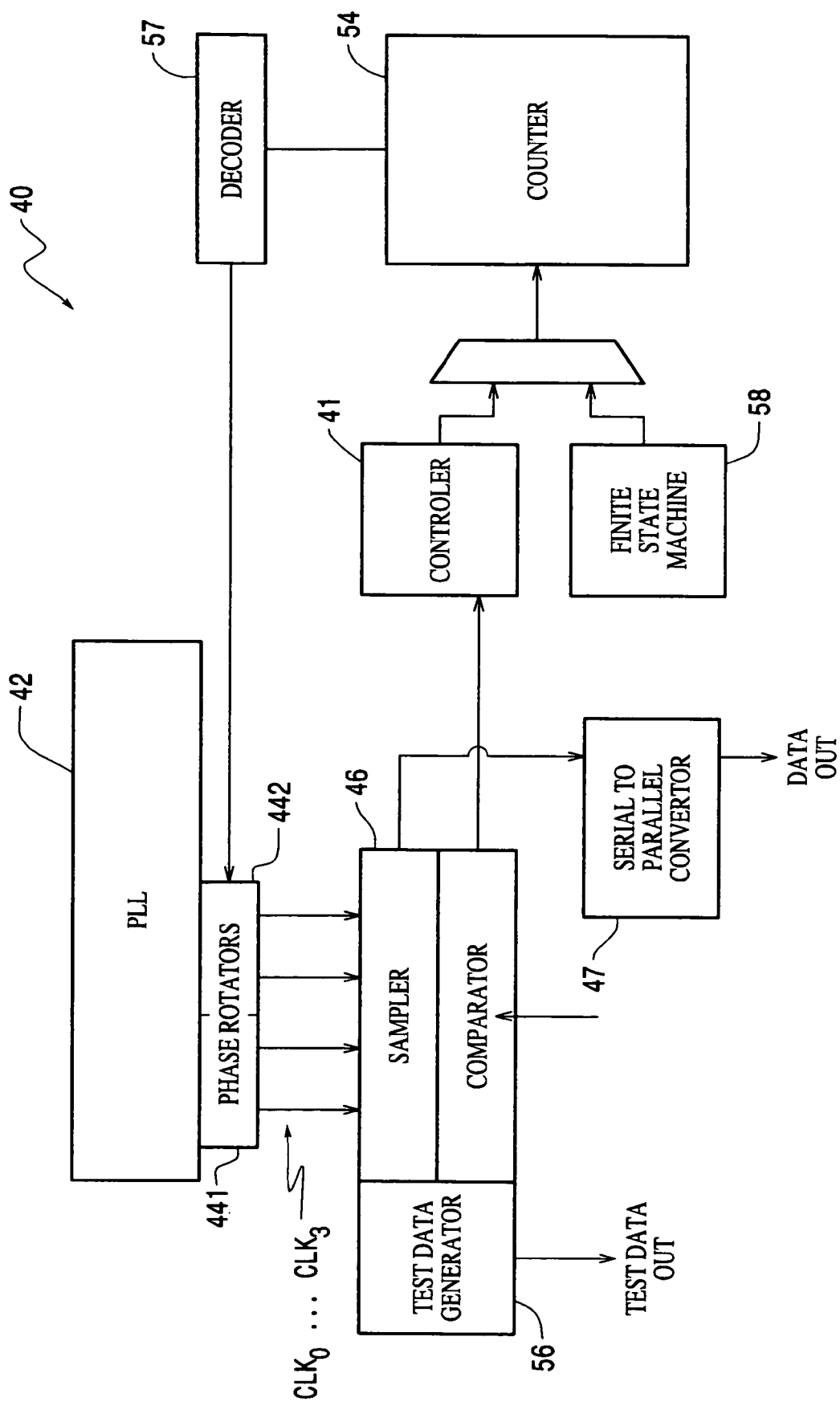
FIG. 2 illustrates a detailed exemplary functional block diagram of a CDR.

FIG. 2 is an exemplary block diagram of the CDR 40, which may be the same as the CDR 50. The CDR 40 includes a controller 41, a phase locked loop clock generator (PLL) 42, phase rotators $44_1$ and $44_2$, a sampler 46, a serial to parallel converter 47, a comparator 48, a counter 54, a test data generator 56, a decoder 57 and an additional finite state machine 58 for test purposes. The test data generator 56 may be a pseudo random number generator, a fixed value stored in a register, any finite state machine, etc. The CDR 40 uses these modules to perform clock and data recovery operation as well as test data generation operations.

Figure 6:
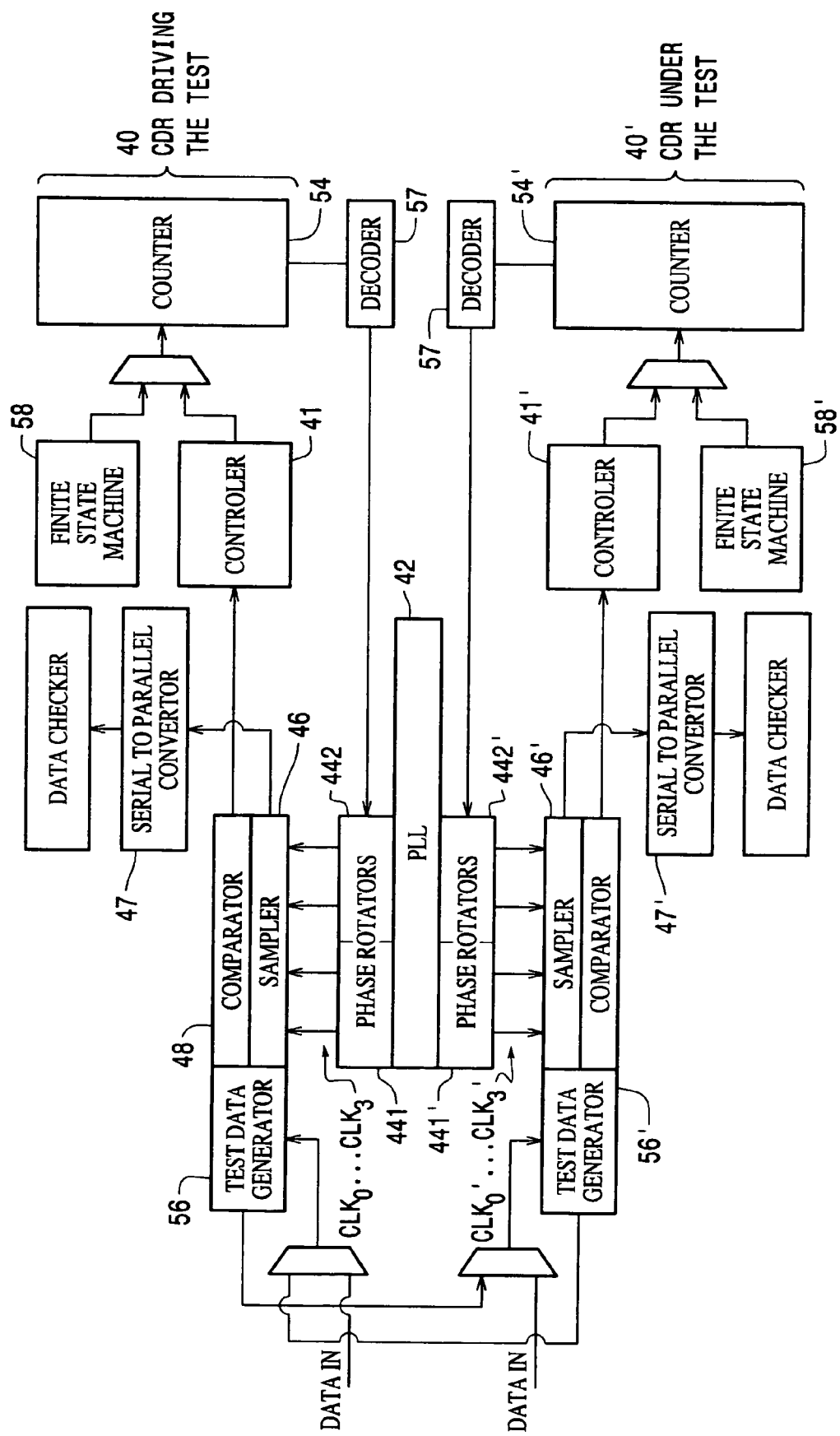
FIG. 6 is an exemplary block diagram of the CDR of FIG. 2 testing another CDR.

The controller 41 receives comparator signals from the comparator 48 and causes the counter 54 to adjust its value at the appropriate time. Referring to FIG. 6, the PLL 42 generates N clock signals at the frequency of operation for the CDRs 40 and 40' locked on the PLL clock and delayed from each other by the period over N. The N clocks are phase shifted together by the phase rotators $44_1$ and $44_2$ ($44'_1$ and $44'_2$) to generate N sampling clocks. Two phase rotators $44_1$ and $44_2$ ($44'_1$ and $44'_2$) are shown generating the sampling clocks Clk0 ... Clk3 (Clk0' ... Clk3') which are at ¼ clock cycle apart based on the PLL delay elements. The phase rotators $44_1$ and $44_2$ may share common control signals such that the sampling clocks Clk0 ... Clk3 are controlled to be always a fixed phase apart (e.g. 90 degree or π/2 apart), for example.

Referring back to FIG. 2, the sampler 46 receives the sampling clocks Clk0 ... Clk3 and samples the serial data stream to generate sampled data bits. The comparator 48 determines edge transitions of the serial data stream based the sampled data bits. Based on the edge transitions, the comparator 48 generates "up", "down" or "no change" signals. The comparator signals are sent to the controller 41 and the sampled data bits are sent with the recovered clock to the serial to parallel converter 47 for parallel conversion. The controller 41 uses the comparator signals to generate control signals that adjust a counter value of the counter 54. The decoder 57 receives the adjusted counter value and generates a phase rotator control signal that causes the phase rotators $44_1$ and $44_2$ to phase shift the sampling clocks Clk0 ... Clk3 and thereby compensate for the data drift conditions.

During data recovery, edge transitions are constantly monitored, to detect for data drift. Depending on where the edge transition lies, the comparator 48 outputs one of three signals, "up", "down" or "no change." When an "up" signal is received, the controller 41 causes the counter 54 to increment its counter value. The decoder 57 receives the incremented counter value and causes the phase rotators $44_1$ and $44_2$ to shift the phase of the sampling clocks Clk0 ... Clk3 to the left (phase lead) by one phase increment. The "down" signal causes the counter 54 to decrement which causes the phase rotators 44₁ and 44₂ to shift right (phase lag) by one phase increment. The "no change" signal does not modify the value of the counter 54.

Figure 3:
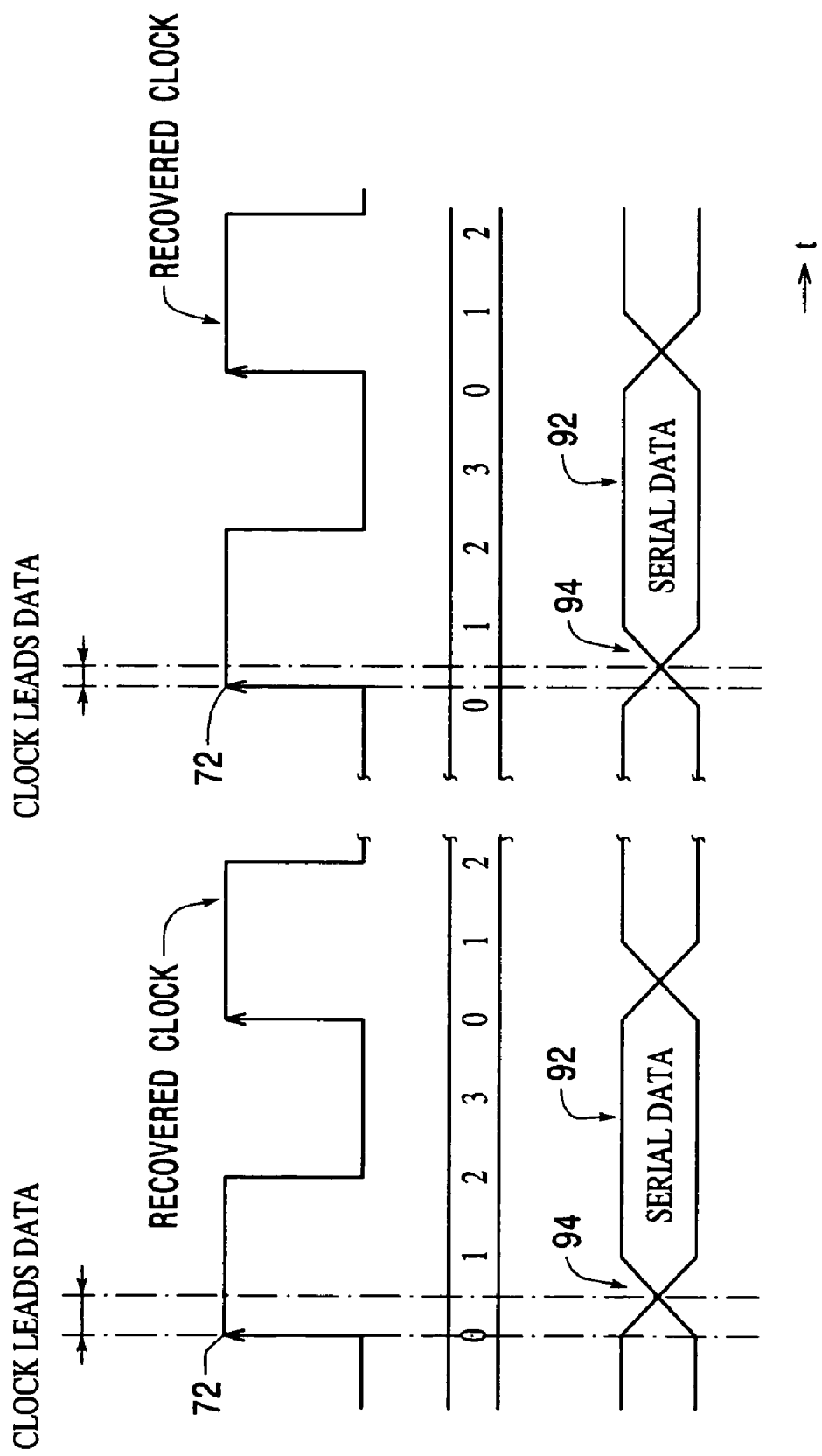
FIGS. 3 and 4 illustrate relative timing relationships between recovered clock and edge transitions of a serial data stream.
Figure 4:
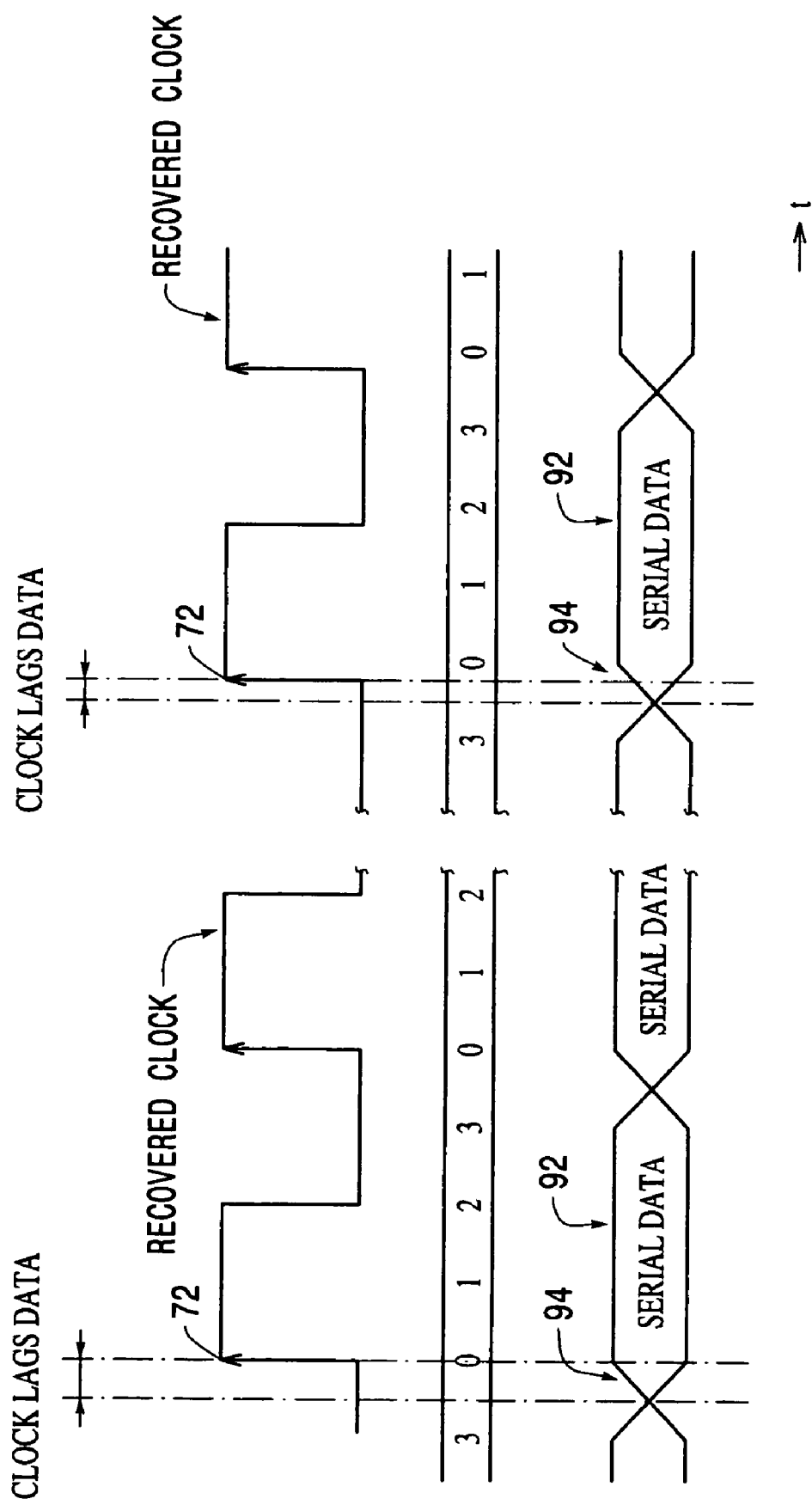

FIGS. 3 and 4 illustrate possible relationships among the recovered clock, the sampling points 0 . . . 3 and the serial data stream. Referring to FIG. 3, on the left side, the edge transition 94 lies between the sampling points 0 and 1. In this case, a rising edge 72 of the recovered clock is "phase leading" the edge transition 94 because rising edge 72 occurs before the edge transition 94. This condition indicates that the data is drifting behind the recovered clock. Thus, to compensate for this data drift, the comparator 48 sends a "down" signal which eventually causes the phase rotators 44₁ and 44₂ to apply a "phase lag" to the sampling clocks Clk0 . . . Clk3. As shown on the right side of FIG. 3, the phase difference between the rising edge 72 and the edge transition 94 has been reduced at a later time reducing the data drift between the recovered clock and the serial data stream. This update of the sampling position is made "smooth" to follow the slow data drift while the high frequency jitter is filtered. For example, the high frequency jitter filter and the number of clock cycles used by the controller 41 may be designed in compliance with known telecommunication or computer standards.

Referring now to FIG. 4, on the left side, the edge transition 94 lies between the sampling points 3 and 0. In this case, a rising edge 72 of the recovered clock is "phase lagging" the edge transition 94 because rising edge 72 occurs after the edge transition 94. This condition indicates that the data is drifting ahead of the recovered clock. To compensate for this data drift, the comparator 48 sends an "up" signal that eventually increments the counter 54 to cause the phase rotators 44₁ and 44₂ to apply a "phase lead" to the clocks Clk0 . . . Clk3. As shown on the right side of FIG. 4, the phase difference between the edge transition 94 and the rising edge 72 has been reduced at a later time reducing the data drift between the recovered clock and the serial data stream. Based on the above summary of the CDR data retrieval operation, CDR functioning as a test data generator is discussed below.

Referring back to FIG. 2, when the CDR 40 operates as a tester, the sampler 46, the serial to parallel converter 47 and the comparator 48 are not used. The test data generator 56, the finite state machine 58, the counter 54 and the phase rotators 44₁ and 44₂ are used to generate test data having data drift conditions. The sampling clocks Clk0 . . . Clk3 are coupled to the test data generator clock so that the generated test data changes phase based on the value of the counter 54. The finite state machine 58 controls incrementing or decrementing the counter 54 to ensure that a full range of data drift conditions is generated.

At the start of a test sequence, the CDR 40 may be initialized as a test data generator by setting the counter 54 to receive increment/decrement signals from the finite state machine 58 instead of the regular increment/decrement signals from the controller 41 and enable test data output from the test data generator 56. The counter 54 may be initialized to any value. For the discussion below, the counter 54 is assumed to be initialized to 0 and the finite state machine 58 is initialized to a Min state.

Also, to control the rate of test data drifts to be below the threshold data drift rate, additional bits 55 may be appended to the least significant end of the counter 54. In this example, two bits are appended to reduce the data drift rate to be less than the threshold rate.

Figure 5:
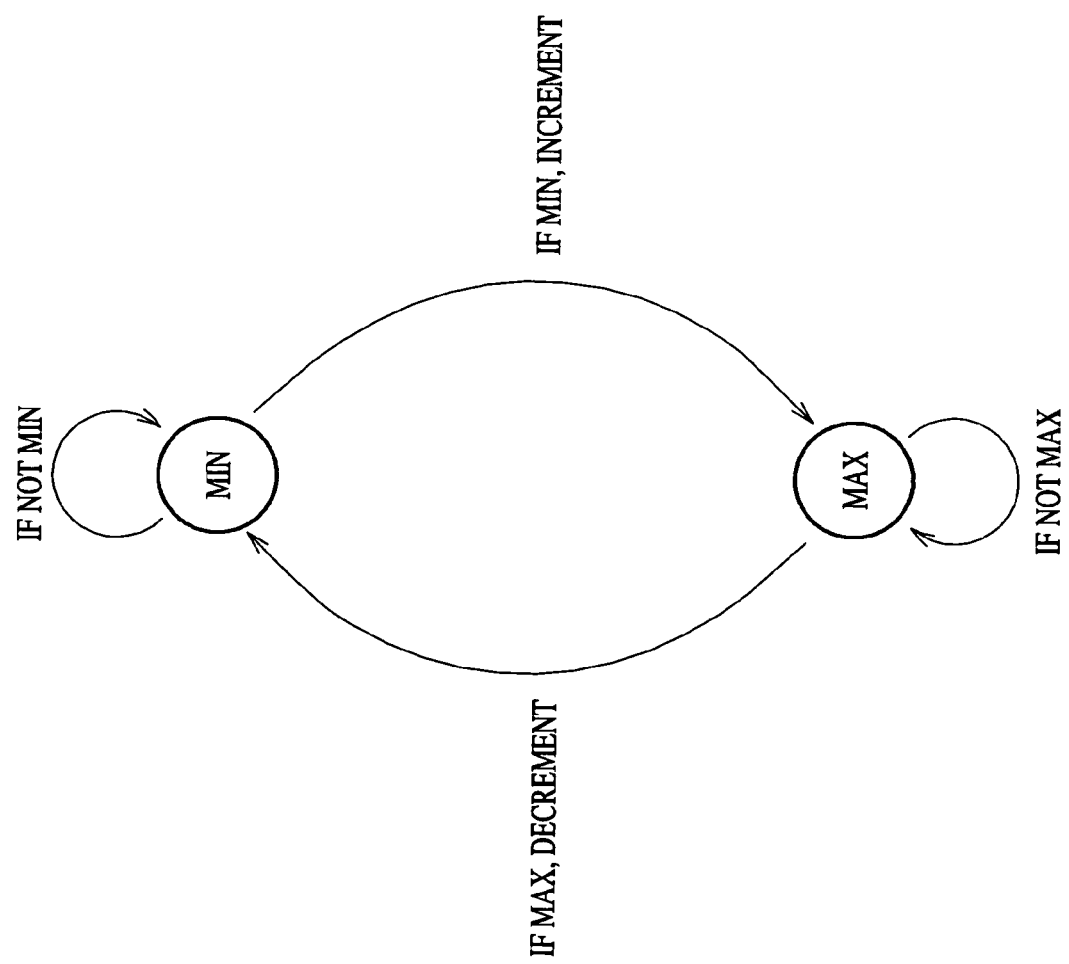
FIG. 5 illustrates an exemplary diagram of a finite state machine.

FIG. 5 shows an exemplary finite state machine 120 having two states Min and Max. Other implementations are also possible to perform the same functions. For example, a four states finite state machine may be implemented. During the first state, the finite state machine initializes the counter 54 such that the test data generator 56 sends test data without data drift to the CDR 40'. During the second state, the finite state machine periodically increments the counter value that causes the phase rotators 44₁ and 44₂ to progressively apply a positive drift to the test data until a maximum counter value is reached. Then, during the third state, the finite state machine periodically decrements the counter value that causes the phase rotators 44₁ and 44₂ to progressively apply a negative drift to the test data until a minimum counter value is reached. Then, during the fourth state, the finite state machine provides a test data generator 56 rest period in which a data checker 62' can check the results of the test data.

Referring now to FIG. 5, after initialization, the finite state machine 120 increments the counter 54 every 16 cycles in the exemplary implementation, i.e., 16 clock cycles correspond to one cycle of the controller 41. Due to the two additional bits, the counter value used by the phase rotators 44₁ and 44₂ is incremented every four times the 16 clock cycles, which is slow enough to be followed by the CDR 40' under test. This continues until a max counter value is reached. At the next clock cycle, the finite state machine 120 transitions to the Max state and decrements the counter 54 (i.e., decrements the appended least significant bits). This continues until a minimum counter value (0) is reached. At the next clock cycle, the finite state machine 120 changes to the Min state and increments the counter 54. Thus, by the above process, the test data drift is changed from 0 degree to 360 degrees and then downwards to 0 degree, and so on until all the test data is generated. By adjusting the counter value, the finite state machine 58 controls the counter 54 to cause the phase rotators 44₁ and 44₂ to phase shift the sampling clocks Clk0 . . . Clk3 left or right which in turn causes the test data to drift in corresponding directions.

FIG. 6 is an exemplary block diagram of the CDR 40 testing another CDR 40'. The CDR 40' may have similar components as the CDR 40 or it may be a CDR without the test data generation components. As described above, the CDRs 40 and 40' use a common PLL 42 clock. Sampling clock signals Clk0 . . . Clk3 and Clk0' . . . . Clk3' are generated by the respective phase rotators 44₁ and 44₂, and 44'₁ and 44'₂. The phase rotators 44₁ and 44₂, and 44'₁ and 44'₂ operate independently from each other based on the counter value of the respective counters 54 and 54'. The output of the test data generator 56 of the CDR 40 is coupled to the input of the sampler 46' of the CDR 40' via its input data port.

The CDR 40' receives test data that is progressively phase shifted from min to max degrees (e.g., from 0 degree to 360 degrees and back to 0 degree). Thus, generating test data simulates a full data drift range thereby forcing the phase rotators 44'₁ and 44'₂ to traverse across the full range of data drift conditions. Accordingly, if the recovered data output by the CDR 40' is correct, then the CDR 40' is operating properly.

The data checker 62' may be used to check the test data results. If a signature generator is included in the CDR 40', then the checker 62' may compare the signature to an expected value. Otherwise, the checker 62' verifies that all the recovered data is correct.

Figure 7:
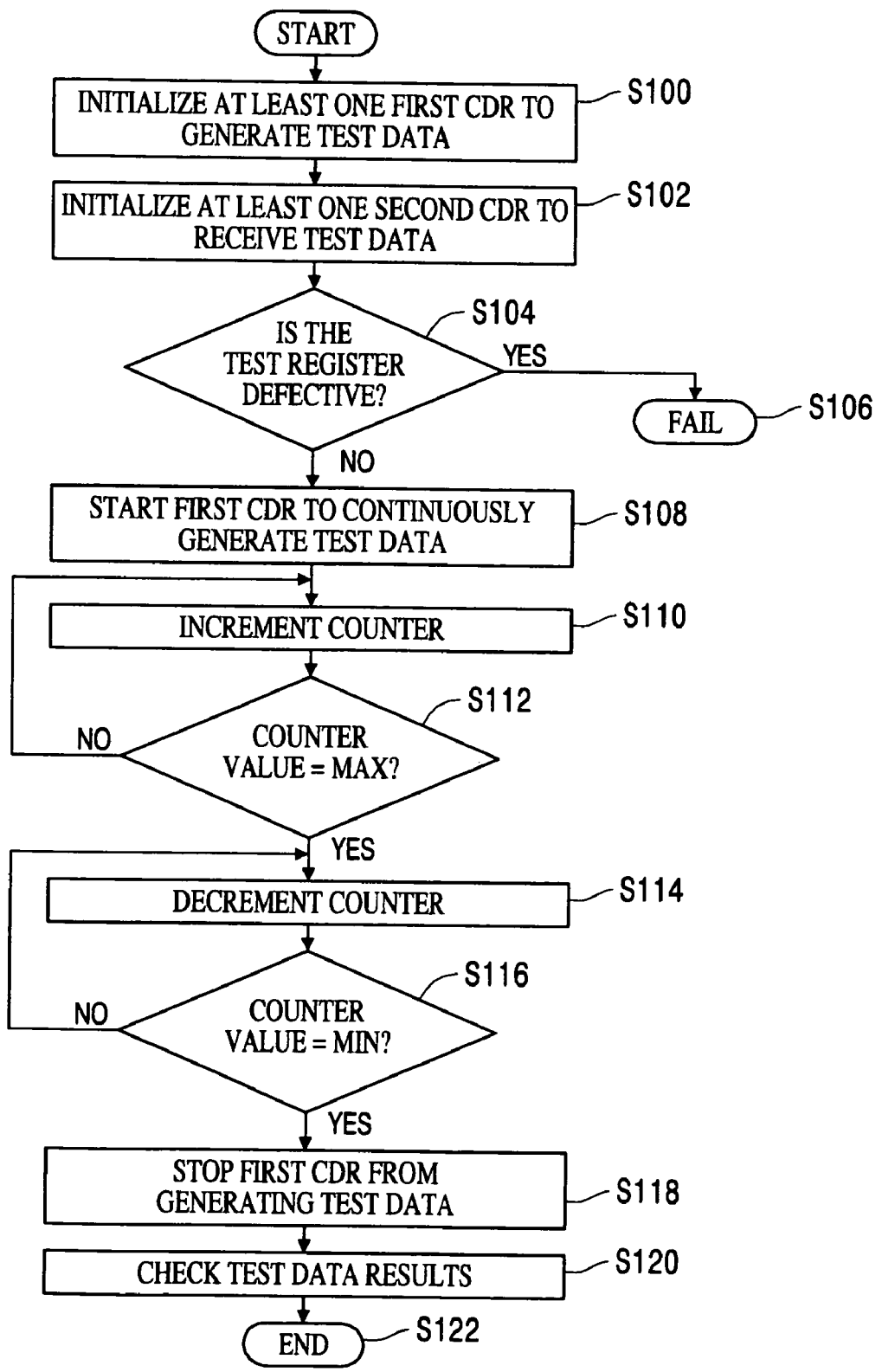
FIGS. 7-9B are flowcharts illustrating exemplary test processes.

FIG. 7 is a flowchart illustrating an exemplary test process. It should be appreciated that multiple CDRs may be involved in the test. In one case, the CDRs are configured in pairs so that one may test the other. Stated differently, within a pair, a first CDR is configured as a test data generator to test a second CDR. Once the test is completed, the second CDR is configured as a test data generator to test the first CDR. In another case, one CDR may be configured as a test data generator to test the remaining CDRs. It should be appreciated that any test configuration method may be used to achieve a desired result.

Referring now to FIG. 7, the exemplary test process starts with a test machine sending appropriate control signals to the CDRs to place them in test mode. At step S100, at least one CDR 40 is initialized for generating test data. As discussed above, the sampler 46, the serial to parallel converter 47 and the comparator 48 are not used when in the test data generator mode. The test machine may select the finite state machine 58 to increment/decrement the counter 54, and initialize the counter 54 to a default counter value, such as "0" such that no data drift is applied to the test data initially. In other cases, the CDR 40 itself may have internal mechanisms that select the finite state machine 58 and initialize the counter 54. As noted above, the output of the finite state machine 58 increments/decrements added least significant bits (LSBs) of the counter 54 to control the test data drift rate. Then, at step S102, at least one CDR 40' to be tested is initialized to receive test data. The CDR 40' may have its data checker 62' initialized to receive and check test data.

After initialization is complete, the process goes to an optional step S104 where a test register of the data checker 62' of the CDR 40' is tested for faults. For example, the test machine, using conventional techniques, detects whether one or more bits of the test register are stuck at logic value "high" or "low". If the test machine detects such fault, then the test process continues to step S106 where the test machine registers the CDR 40' as "fail" and ends the test process. Otherwise, the test process continues to step S108.

At step S108, the test machine may activate the test data generator 56 to generate and output test data points at every clock cycle. In other cases, the CDR 40's internal mechanisms, such as the finite state machine 58, may activate the test data generator. It should be appreciated that the test data generator 56 continuously generates test data points throughout the test process until step S118 is reached. The test process then goes to step S110. At step S110, the finite state machine 58 increments the counter 54 (which now includes the two added LSBs). It should be appreciated that due to the added LSBs, it takes the counter 54 four times as long to cause the phase rotators $44_1$ and $44_2$ to phase shift the sampling clocks Clk0 . . . . Clk3 by one phase increment. The test process goes to step S112. At step S112, the finite state machine 58 determines if the counter value equals to a max value. If not equal to the max value, then the test process returns to step S110; otherwise the process goes to step S114.

At step S114, the counter is decremented and the test process goes to step S116. At step S116, the finite state machine 58 determines if the counter value equals to a min value. If not equal to the min value, then the test process returns to step S114; otherwise, the test process goes to step S118. At step S118, the test machine causes the test data generator 56 to stop generating test data points. Or, the CDR 40's internal mechanisms may stop the operation of the test data generator 56. Then, at step S120, the test machine checks the test register of the data checker 62' to verify the test data results for correctness. The test process then continues to step S122, where the test process ends.

Figure 8:
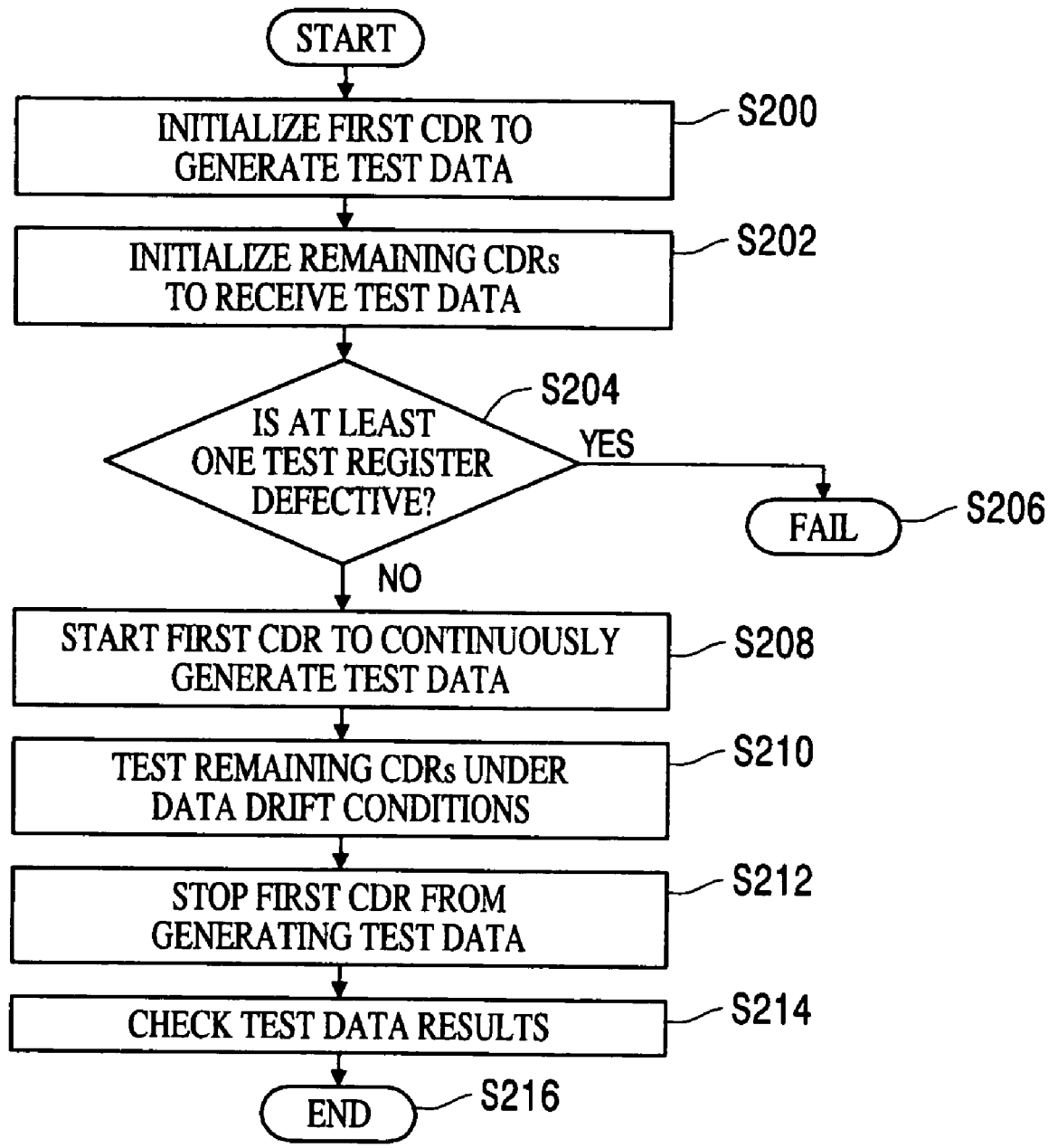

FIG. 8 is a flowchart illustrating an exemplary test process where one CDR is used as a test data generator for remaining CDRs. The exemplary test process starts at step S200 with the test machine sending appropriate control signals which may initialize one CDR as a test data generator. Then, at step S202, the test machine may initialize remaining CDRs to receive test data. The initialization process may be similar to that described above with respect to FIG. 7.

After initialization is complete, the test process goes to an optional step S204 where the test machine checks the test registers of the data checkers of the CDRs to be tested. For example, the test machine determines whether one or more test registers have one or more bits that are stuck at logic value "high" or "low". If so, then the test process continues to step S206 where the test process ends. There are cases where the test machine marks the CDRs with stuck bits to be defective. Only after a predetermined number of defective CDRs are marked will the test process go to step S206 where the test process ends. Otherwise, the test process continues to step S208.

At step S208, the test machine may activate the CDR functioning as a test data generator to continuously generate test data. Or, as discussed above, in some cases the CDR's internal mechanisms may activate the test data generator. Then, at step S210, the remaining CDRs are tested under data drift conditions. This portion of the test process may be similar to the test process steps S110 to S116 described with respect to FIG. 7. Then, at step S212, the test machine, or in some cases, the CDR's internal mechanisms, may cause the test data generator to stop generating test data points. The test process goes to step S214 where the test machine checks the test registers of the data checkers to verify the test data results for correctness. The test process then continues to step S216, where the test process ends.

Figure 9A:
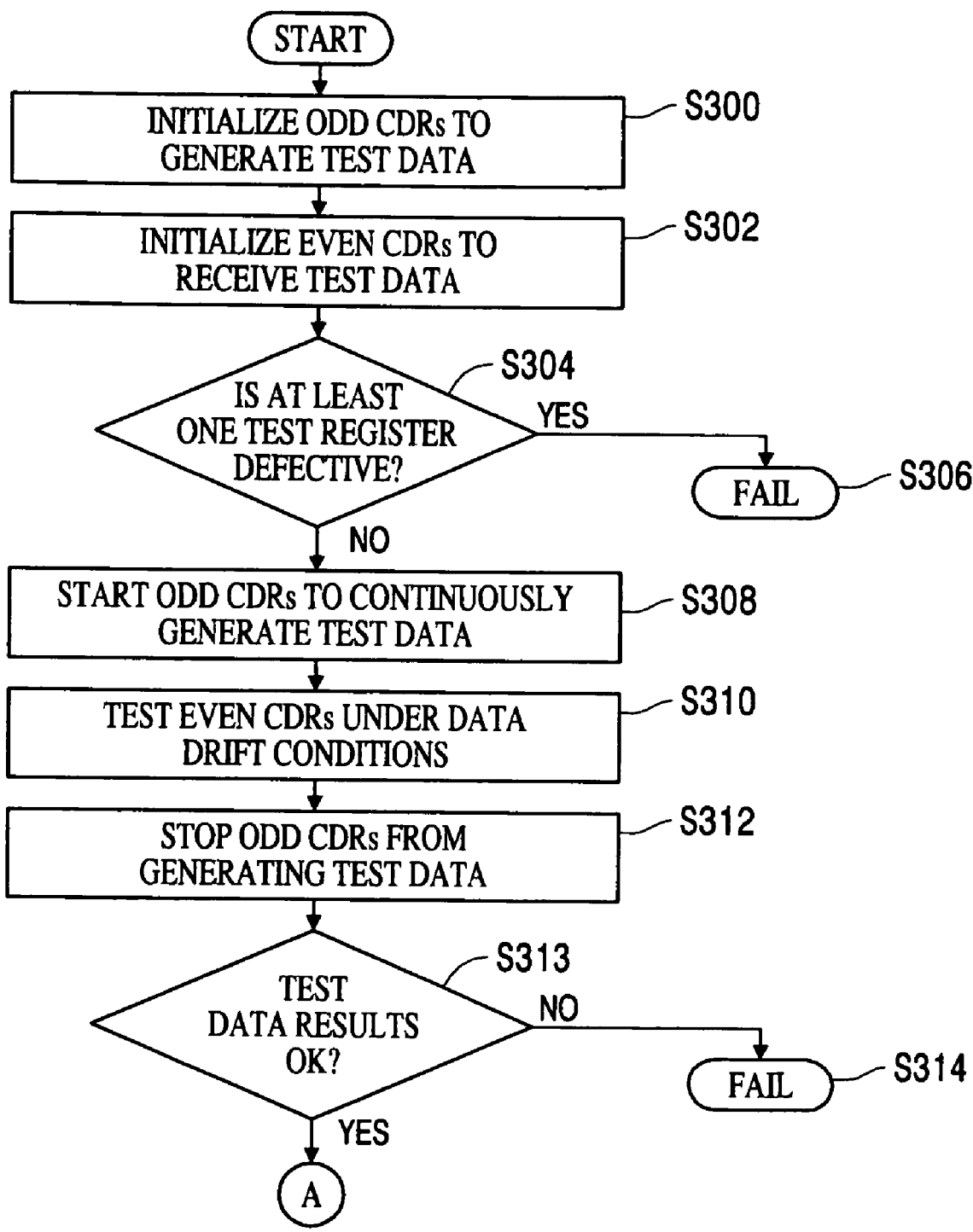
Figure 9B:
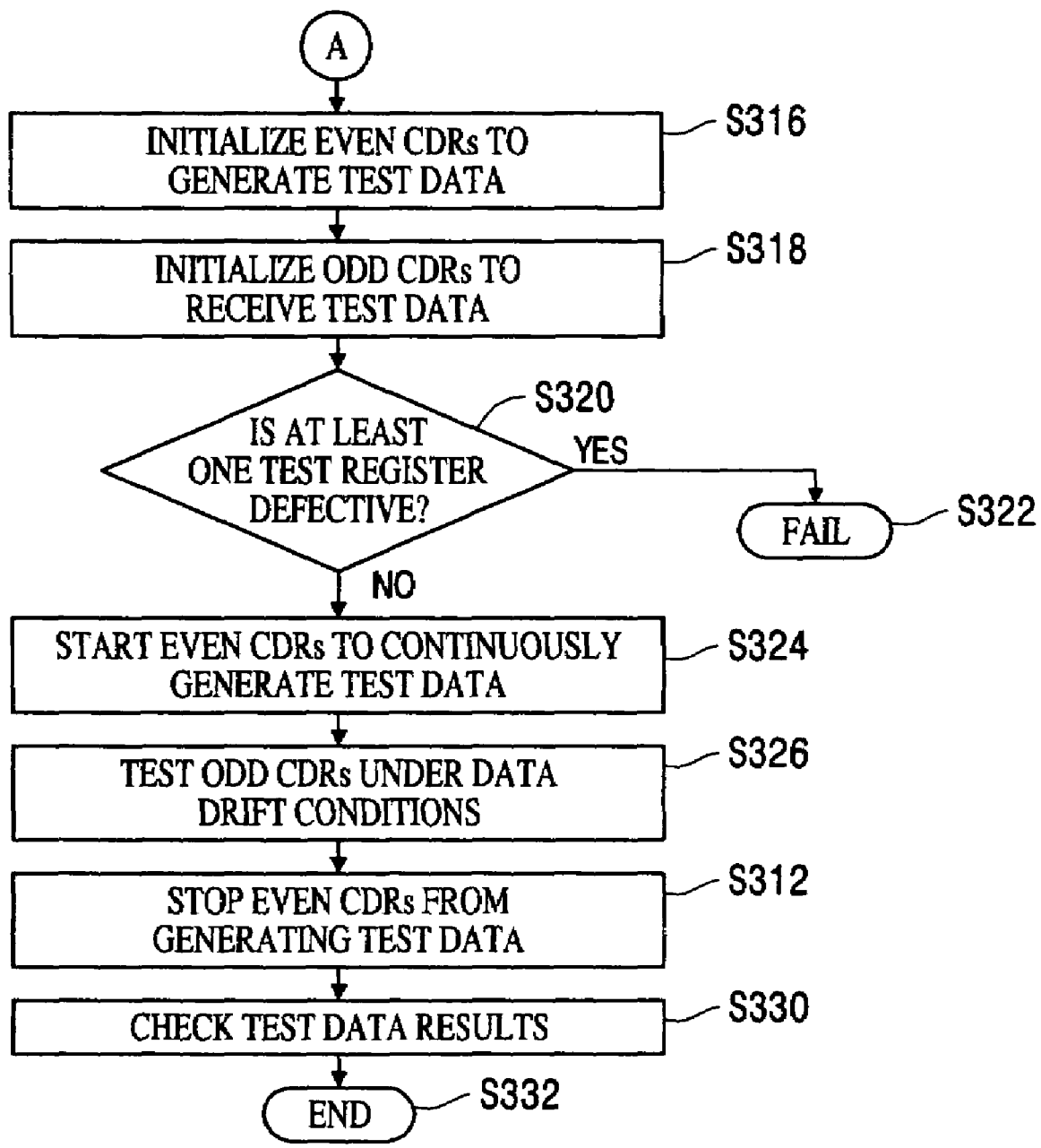

FIG. 9 is a flowchart illustrating an exemplary test process where the CDRs are configured in pairs so that one may test the other and vice versa. Plural CDRs are paired and for simplicity of description, one of the CDRs in the pair will be referred to as an "odd" CDR and the other CDR will be referred to as an "even" CDR. The exemplary test process starts at step S300 where the test machine sends appropriate control signals which may initialize the odd CDRs as test data generators. Then, at step S302, the test machine may initialize the even CDRs to receive test data.

After initialization is complete, the test process goes to an optional step S304 where the test machine checks the test registers of the even CDRs. If one or more test registers have one or more bits that are stuck at logic value "high" or "low", then the test process goes to step S306 where the test process ends. Otherwise, the test process continues to step S308.

At step S308, the test machine or the odd CDRs' internal mechanisms may activate the odd CDRs to function as test data generators. Then, at step S310, the even CDRs are tested under data drift conditions. This portion of the test process may be similar to the test process steps S110 to S116 described with respect to FIG. 7. Then, at step S312, the test machine or the odd CDRs' internal mechanisms may cause the odd CDRs to stop generating test data points. At step S313, the test machine checks the test registers of the even CDRs to verify the test data results for correctness. If a predetermined number of test registers output erroneous data results the test process goes to step S314 where the test process ends. Otherwise, the test process continues to step S316.

At step S316, the test machine may initialze the even CDRs to function as test data generators. Then, at step S318, the test machine may initialize the odd CDRs to receive test data. The test process then continues to an optional step S320. At step S320, the test machine checks the test registers of the odd CDRs. If a predetermined number of test registers have one or more bits that are stuck at logic value "high" or "low", then the test process goes to step S322 where the test process ends. Otherwise, the test process continues to step S324.

At step S324, the test machine or the even CDRs' internal mechanisms may activate the even CDRs to function as test data generators. Then, at step S326, the odd CDRs are tested under data drift conditions. This portion of the test process may be similar to the test process steps S110 to S116 described with respect to FIG. 7. Then, at step S328, the test machine or the even CDRs' internal mechanisms may cause the even CDRs to stop generating test data points. At step S330, the test machine checks the test registers of the odd CDRs to verify the test data results for correctness. The test process then continues to step S332, where the test process ends.

It should be appreciated that although references are made to PLLs, this should not be construed as limiting the scope of the invention. For example, Delay Locked Loops (DLLs), etc., may be used. It should be appreciated that the exemplary modules described above can be various semiconductor devices such as ASICs or other integrated circuits, a discrete element circuit, a programmable logic device such as a PLD, PLA, FPGA or PAL, or the like. The particular form that the CDRs have is a design choice and would be apparent to those skilled in the art.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of testing a clock and data recovery device (CDR), comprising:
   producing test data from a first CDR;
   outputting the test data based on a clock;
   generating data drift in the test data by changing a phase of the clock;
   setting the phase of the clock based on a count value;
   changing the count value across a range of phase shifts;
   incrementing/decrementing the count value until a maximum/minimum count value is reached;
   subsequently decrementing/incrementing the count value until a minimum/maximum count value is reached;
   repeating the incrementing/decrementing step and the subsequently decrementing/incrementing step until all the test data is generated; and
   testing a second CDR based on the test data from the first CDR.

2. The method of claim 1, further comprising:
   adding one or more least significant bits to the counter value;
   incrementing/decrementing added least significant bits when incrementing/decrementing the counter value.

3. The method of claim 1, further comprising:
   generating test data results in the second CDR device; and
   verifying the test data results.

4. The method of claim 1, further comprising:
   producing test data from the second CDR; and
   testing the first CDR based on the test data from the second CDR.

5. A clock and data recovery device (CDR), comprising:
   a phase variable clock source to generate a phase variable clock;
   a test data generator to generate test data based on the phase variable clock;
   a counter that has a count value to control a phase of the phase variable clock; and
   a finite state machine to increment/decrement the count value until a maximum/minimum count value is reached, and subsequently decrement/increment the count value until a minimum/maximum count value is reached,
   wherein the finite machine increments/decrements the count value until all the test data is generated.

6. The CDR of claim 5, wherein:
   the counter includes one or more least significant bits added to the counter value, the counter without the least significant bits are used to control the phase of the phase variable clock; and
   the finite state machine increments/decrements the least significant value bits when incrementing/decrementing the counter value.

7. The CDR of claim 5, wherein the test data generator is a pseudo random number generator.

8. The CDR of claim 5, wherein the phase variable clock source is a phase rotator coupled to a phase locked loop (PLL) oscillator.

9. A system or a network implementing the CDR of claim 5.

10. A clock and data recovery device (CDR) to test another second CDR, comprising:
    means for generating test data to test the second CDR;
    means for producing a range of data drift conditions in the test data by changing a phase of a clock;
    means for setting the phase of the clock based on a count value;
    means for changing the count value across a range of phase shifts;
    means for incrementing/decrementing the count value until a maximum/minimum count value is reached, and subsequently decrementing/incrementing the count value until a minimum/maximum count value is reached.

11. The CDR of claim 10, wherein means for producing a range of data drift conditions include means for reducing a rate of data drift.

12. An apparatus including a plurality of clock and data recovery devices, comprising:
    a first CDR having a test data generator and a finite state machine to adjust data drift in the test data by setting a phase of a clock based on a count value; and
    another second CDR, wherein the first CDR uses the test data generator to generate test data to test the second CDR,
    wherein the finite state machine increments/decrements the count value until a maximum/minimum count value is reached, and subsequently decrements/increments the count value until a minimum/maximum count value is reached, and
    wherein the finite machine increments/decrements the count value until all the test data is generated.

13. The apparatus of claim 12, further comprising:
    the second CDR having a data checker to check a test data result output.

* * * * *